(12) United States Patent
Hordis

(10) Patent No.: US 7,367,131 B1
(45) Date of Patent: May 6, 2008

(54) SYSTEM FOR LOCATING A JUNCTION BOX

(76) Inventor: Robert Hordis, 154 Country Club Dr., Lumberton, NJ (US) 08048

( * ) Notice: Subject to any disclaimer, the term of this patent is extended or adjusted under 35 U.S.C. 154(b) by 28 days.

(21) Appl. No.: 11/329,619

(22) Filed: Jan. 11, 2006

(51) Int. Cl.
G01B 1/00 (2006.01)
H01H 9/02 (2006.01)

(52) U.S. Cl. ............... 33/528; 33/DIG. 1; 33/DIG. 10; 174/58; 324/67

(58) Field of Classification Search ............... 33/528, 33/DIG. 10, DIG. 1, 574, 579, 562, 563, 33/566, 613, 645; 174/58, 50, 53, 57, 480, 174/481; 324/67; 248/906; 220/3.2–3.9, 220/3.92, 3.94
See application file for complete search history.

(56) References Cited

U.S. PATENT DOCUMENTS

| | | | | |
|---|---|---|---|---|
| 1,971,189 A | | 8/1934 | Leibing | 324/67 |
| 2,775,812 A | * | 1/1957 | Mohr | 29/407.1 |
| 2,788,151 A | * | 4/1957 | Shore | 220/3.4 |
| 2,809,440 A | * | 10/1957 | Schlage | 33/197 |
| 3,015,408 A | * | 1/1962 | Campbell et al. | 220/3.4 |
| 3,253,730 A | * | 5/1966 | Mount | 220/3.4 |
| 3,722,360 A | | 3/1973 | Blakey et al. | 409/131 |
| 3,723,928 A | | 3/1973 | Blakey et al. | 335/285 |
| 3,888,013 A | * | 6/1975 | Benoit | 33/528 |
| 4,096,964 A | * | 6/1978 | Glick | 220/3.4 |
| 4,335,511 A | * | 6/1982 | Bowling | 30/366 |
| 4,342,145 A | | 8/1982 | Kotchy | 29/409.09 |
| 4,384,396 A | | 5/1983 | Smolik | 29/409.09 |
| 4,388,890 A | | 6/1983 | Wester et al. | 116/204 |
| 4,802,284 A | * | 2/1989 | Jackson | 33/528 |
| 5,434,500 A | | 7/1995 | Hauck et al. | 324/67 |
| 5,946,809 A | * | 9/1999 | Bright | 30/361 |
| 6,226,882 B1 | * | 5/2001 | Barr | 33/528 |
| 6,452,097 B1 | | 9/2002 | DeWall | 174/58 |
| 6,708,421 B1 | | 3/2004 | Crorey | 33/613 |
| 7,134,217 B2 | * | 11/2006 | Melittas | 33/528 |

* cited by examiner

Primary Examiner—G. Bradley Bennett
Assistant Examiner—Amy Cohen Johnson
(74) Attorney, Agent, or Firm—Norman E. Lehrer

(57) ABSTRACT

A system for locating a junction box installed within the framework of a structure and behind a wall includes a first magnet mounted on a plate with the plate being removably mounted to a junction box, a spring actively biasing the magnet outwardly from the plate, and a second magnet located outside of the wall used to identify the location of the first magnet, and thereby, the electrical box, behind the wall.

9 Claims, 3 Drawing Sheets

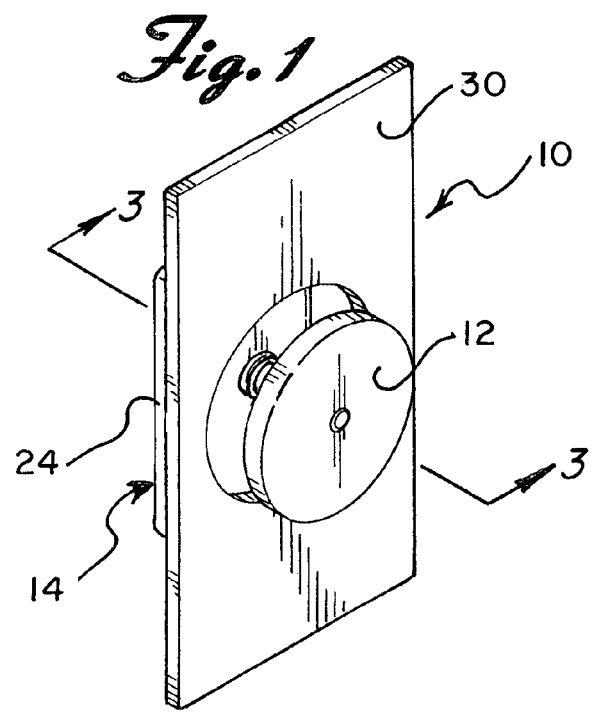
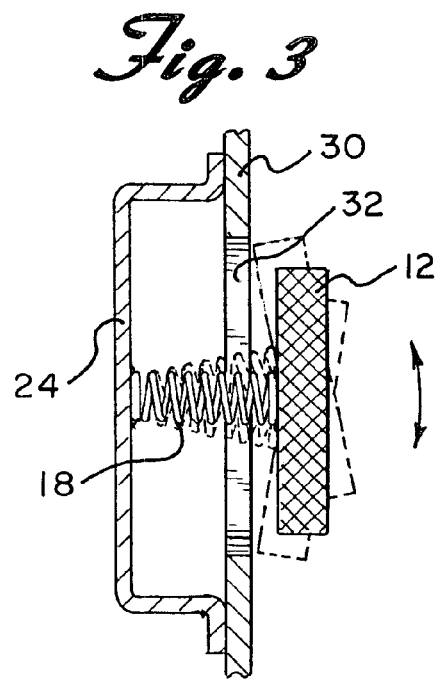
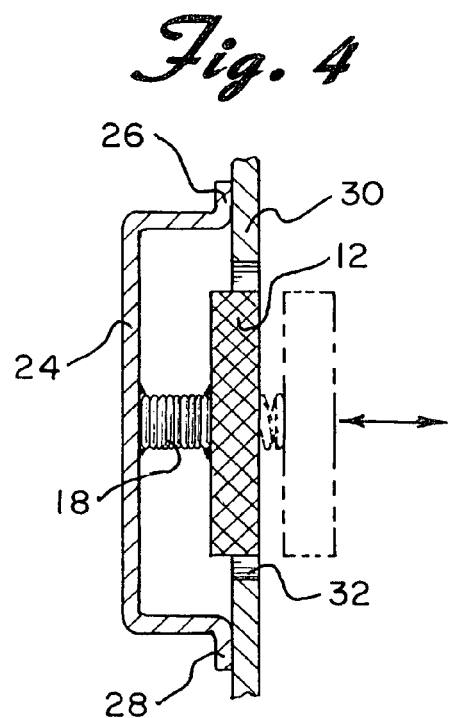
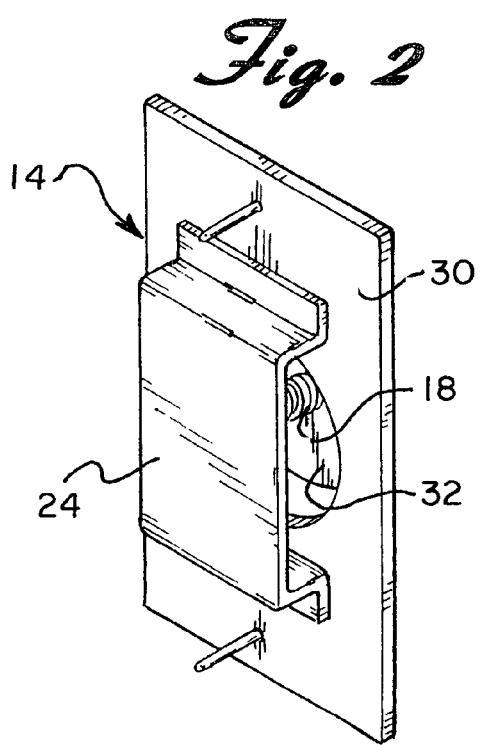

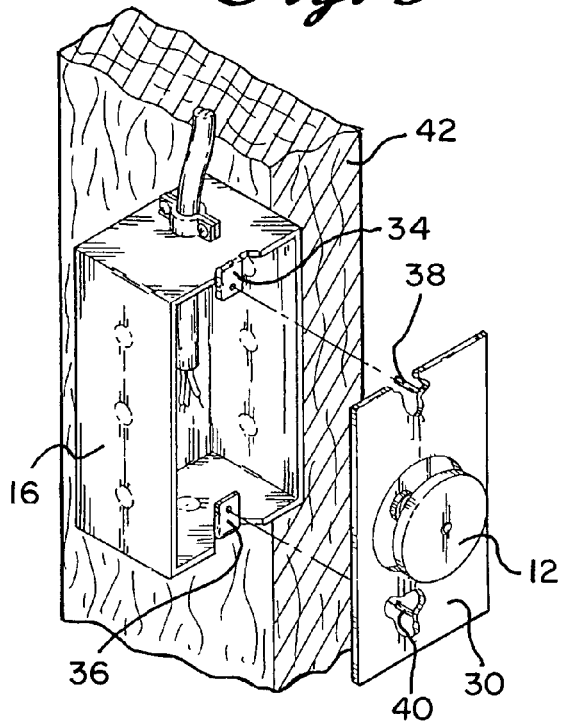
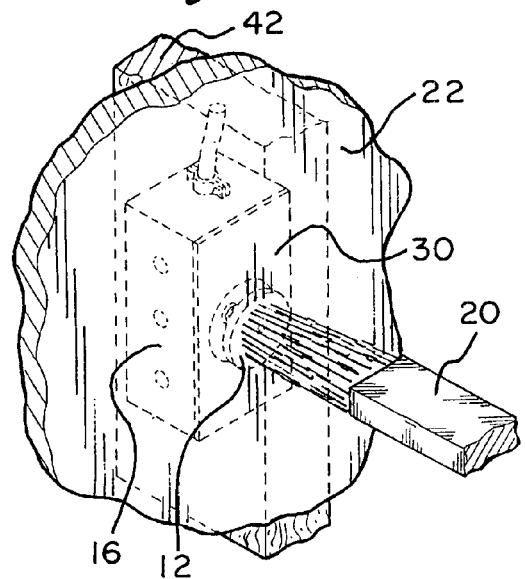
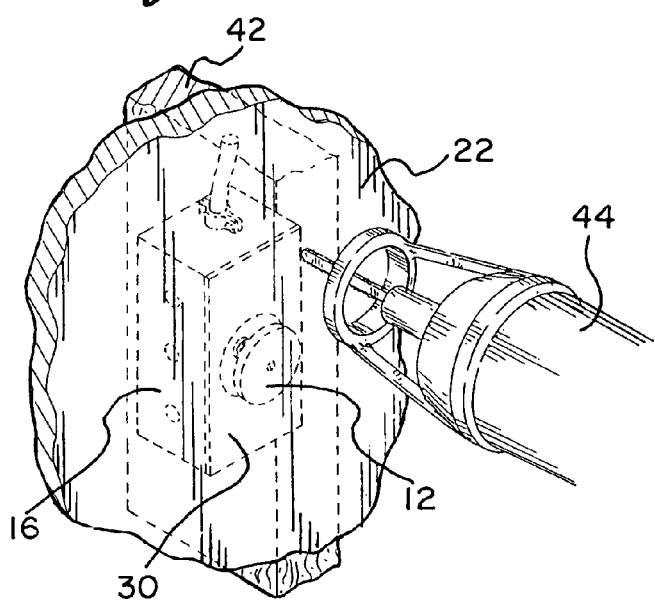
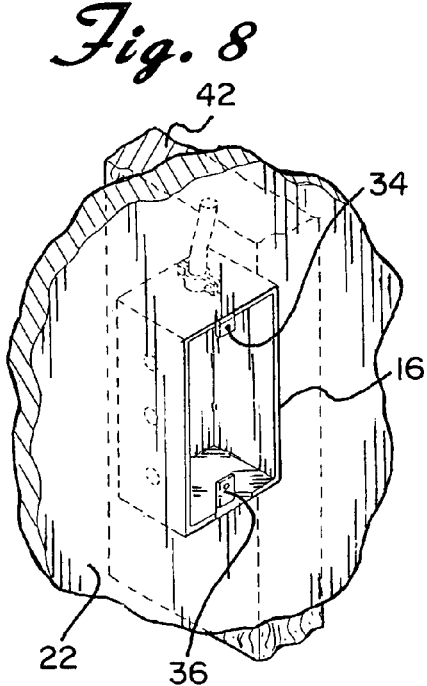

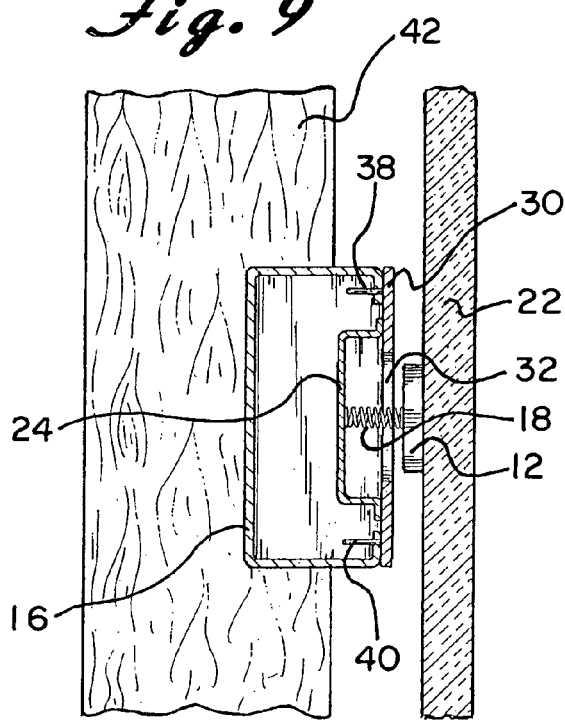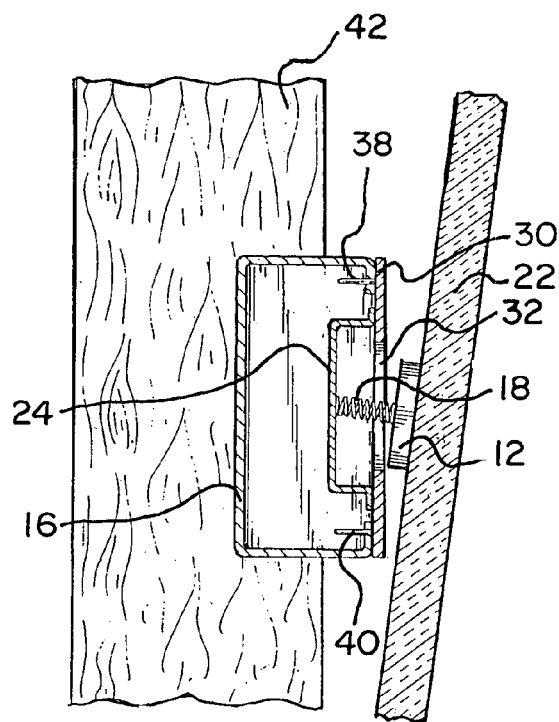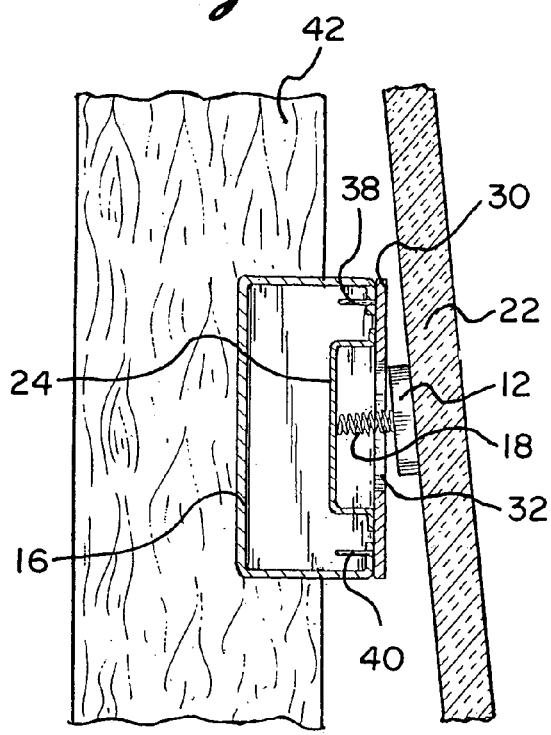

SYSTEM FOR LOCATING A JUNCTION BOX

BACKGROUND OF THE INVENTION

The present invention is directed toward a system for locating a junction box behind a wall and more particularly, toward a system that uses magnets to locate the box.

In building construction, drywall is typically installed on wall studs over junction or electrical boxes. In order to locate the box, measurements relative to the walls, floor or ceiling are taken and are then used to determine where the hole should be cut in order to reach the box. This is a rather inaccurate and time consuming way to locate the box.

Several different methods for locating electrical or outlet boxes have been proposed. One method is by using magnets or ferromagnetic material. For example, U.S. Pat. No. 6,708,421 to Crorey discloses a device for locating a junction box behind a wall. The device includes a first magnet positioned within the box and a second magnet positioned on the outer surface of the wall in order to locate the magnet or magnets located within the box. However, when installing sheet material on walls, the sheet material is never precisely parallel with the junction box face until the hole for the box is cut. This causes a separation between the magnet in the box and the inner surface of the sheet material which can be a quarter inch or more. As magnetic attraction decreases exponentially with distance, this small space can result in unsatisfactory attraction on the external magnet.

Also, U.S. Pat. No. 6,452,097 to DeWall discloses a system for locating an outlet box behind drywall. A magnet may be positioned within the box via a plate, a wire, or magnet mounting tape. A magnet sensing device is used on the outer surface of the wall in order to locate the box. However, it appears that the magnet must be centrally located within the box in order for the sensing device to locate the magnet. In addition, the same separation between the magnet in the box and the sheet material which appears in Crorey exists in DeWall. Even further, the magnetic tape or magnets on a wire cannot protect the contents of the junction box from damage in the cutting process. Additionally, if the magnet is mounted flush with a plate in the box, it can be difficult to remove as there is no protrusion to grasp after cutting the hole.

Therefore a need exists for a method for locating a junction box in a simple, accurate, and efficient manner.

SUMMARY OF THE INVENTION

The present invention is designed to overcome the deficiencies of the prior art discussed above. It is an object of the present invention to provide an efficient and accurate system for locating a junction box.

It is another object of the present invention to provide a system for locating a junction box easily and inexpensively.

In accordance with the illustrative embodiments demonstrating features and advantages of the present invention, there is provided a system for locating a junction box installed within the framework of a structure and behind a wall or similar surface including a magnet mounted on a plate, the plate being removably mounted to a junction box, means for biasing the magnet outwardly from the plate, and means for locating the magnet through the wall. The locating means may be a second magnet and the biasing means may be a spring.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form that is presently preferred; it being understood that the invention is not intended to be limited to the precise arrangements and instrumentalities shown.

FIG. 1 is a front perspective view of the plate of the present invention with a magnet extending therefrom;

FIG. 2 is a rear perspective view of the plate of the present invention;

FIG. 3 is a cross-sectional view taken through line 3-3 of FIG. 1;

FIG. 4 is a cross-sectional view of the plate of the present invention similar to FIG. 3 but showing the magnet in a retracted position;

FIG. 5 is an exploded view of the electrical junction box and the plate;

FIG. 6 illustrates a magnet being used to locate an electrical junction box behind a sheet of drywall;

FIG. 7 illustrates cutting the drywall in order to reach the junction box;

FIG. 8 illustrates the junction box after being cut out;

FIG. 9 illustrates the locating device of the present invention being used to locate a junction box behind a wall that is essentially vertical;

FIG. 10 illustrates the locating device of the present invention being used to locate a junction box behind a wall that is at and angle; and FIG. 11 illustrates the locating device of the present invention being used to locate a junction box behind a wall that is angled in a different direction.

DETAILED DESCRIPTION OF THE PREFERRED EMBODIMENT

Referring now to the drawings in detail wherein like reference numerals have been used throughout the various figures to designate like elements, there is shown in FIG. 1 a system for finding a junction box constructed in accordance with the principles of the present invention and designated generally as 10. As used herein, the terms junction box, outlet box or electrical box may be used interchangeably and are all intended to refer to the same type of device. Such boxes are, per se, well known in the art and may be made of metal or plastic. By way of example, they are used for housing or supporting electrical outlets, wall switches, telephone or cable or computer modem connectors and the like. As should be readily apparent to those skilled in the art, the invention also has use for locating recessed lighting fixtures and the like. While these may not technically be "electrical" or "junction" boxes, as those terms are used in the art, for the purposes of this application, they should be considered to be included.

The system for locating a junction box installed within the framework of a structure and behind a wall of the present invention essentially includes a magnet 12 mounted on a plate 14, the plate 14 being positioned within a junction box 16, means for biasing 18 the magnet 12 outwardly from the plate 14, and means 20 for locating the magnet 12 through the wall 22.

The plate 14 includes a rear generally U-shaped member 24 having an upper arm 26 and a lower arm 28 and a front generally rectangular member 30. The rear member 14 is secured to the rectangular member 30 via the upper and lower arms 26 and 28. (See FIG. 4.) The rectangular member 30 has an opening 32 through the center thereof. (See FIG. 2.) The biasing means 18 is mounted to the rear member 24 and the biasing means 18 may be a spring. (See FIG. 3.) The magnet 12 is secured to the spring 18 so that the magnet 12 extends outwardly through the central opening 32 of the rectangular front member 30 and is moveable or pivotal in various directions, as shown in phantom in FIG. 3. The magnet 12 normally extends outwardly beyond the front forwardmost edge of the junction box 16 and is also capable of lying flush with the front member 30 or extending straight outwardly from the front member 30. (See FIG. 4.)

While the spring 18 is shown to be in the form of a coil compression spring, it should be understood that this is by way of example only. It is possible that other types of devices that accomplish the same results could also be used. These may include a leaf spring or a block or rod of resilient compressible foam material. In each case, the "spring" must be capable of biasing the magnet outwardly beyond the front forwardmost edge of the junction box 16. It must also allow the magnet to pivot in substantially all directions against the force of the "spring" and it must allow it to move rearwardly against the force of the "spring."

The rectangular front member 30 is removably secured to the upper and lower flanges 34 and 36 located in the front of the electrical box 16 via bolts 38 and 40, for example, as shown in FIG. 5. The magnet 12 may be generally circular but other sizes and shapes may also be used.

In order to use the system of the present invention, the plate 14 is attached or mounted to the open front side of a typical electrical box 16 that has been mounted on studs 42 so that the magnet 12 extends outwardly from the plate 14. (See FIG. 5.) Drywall or wallboard or similar material 22 is then hung in front of the box 16. Locating means 20, which may be a second magnet, is then moved along the outer side of the drywall 44. (See FIG. 6.) Once the second magnet 20 has located the magnet 12 mounted on the plate 14, the drywall 22 may be cut using a cutting tool 44 in order to expose the electrical box 16. (See FIG. 7.) The plate 14 may then be removed from the box 16 in order to be reused. (See FIG. 8.)

An advantage of the present system is that because the spring biases the magnet outwardly from the plate and allows the same to pivot, the box may be found easily regardless of how or where the drywall is hung in relation to the box. (See FIGS. 9-11.) That is, the magnet 12 extends outwardly from the box 16 and will flex or pivot so as always to lie flush with the back surface of the drywall 22 even if the drywall is not precisely parallel with the box 16. In this way, the locating means is more certain to accurately locate and attract the magnet mounted within the box.

Although the invention has been described and shown with reference to a substantially vertical wall, it should be readily apparent that it is also useful with walls that are intentionally angled or for locating junction boxes behind ceilings or floors. For conveniences, all such surfaces (walls, floors, ceilings and the like) shall be referred to herein as walls.

While the element 12 is referred to herein as a magnet, is should be understood that this is for convenience only. The element may be a ferromagnetic or paramagnetic material such as iron or the like that is magnetically attractable. If this is done, the locating means 20 may be a magnet. Alternatively, both the element 12 and the locating means 20 may be magnets or the element 12 may be a magnet and the locating means 20 may be any magnetically attractable material including iron or iron filings. In any event, use of the term magnet when referring to the element 12 or 20 is intended to include any magnetically attractable material if the opposing means is a magnetic.

The present invention may be embodied in other specific forms without departing from the spirit or essential attributes thereof and accordingly, reference should be made to the appended claims rather than to the foregoing specification as indicating the scope of the invention.

I claim:

1. A system for locating a junction box which has a front forwardmost edge and installed within the framework of a structure and behind a wall comprising:

a magnetic means removably mounted on said junction box;

means biasing said magnetic means outwardly so as to be located beyond said front forwardmost edge of said junction box while allowing said magnetic means to pivot against the force of said biasing means when contacted by said wall; and means for locating said magnetic means through the wall.

2. The system for locating a junction box of claim 1 wherein said locating means is a magnetic means.

3. The system for locating a junction box of claim 1 further including a plate removably mounted to said junction box and wherein said biasing means is carried by said plate.

4. The system for locating a junction box of claim 3 wherein said plate includes an opening therethrough and wherein said magnetic means removably mounted to said box is capable of extending outwardly through said opening.

5. The system for locating a junction box of claim 4 wherein said opening is generally circular.

6. The system for locating a junction box of claim 5 wherein said magnetic means removably mounted to said box is generally circular.

7. The system for locating a junction box of claim 1 wherein said locating means is a magnet.

8. The system for locating a junction box of claim 1 wherein said biasing means is a spring.

9. The system for locating a junction box of claim 8 wherein said biasing means is a coil spring.

* * * * *